(12) United States Patent
Tobita et al.

(10) Patent No.: US 8,136,482 B2
(45) Date of Patent: Mar. 20, 2012

(54) AUTOMATIC WATER SUPPLY NOZZLE FOR ANIMALS AND AUTOMATIC WATER SUPPLY CAP FOR ANIMALS

(75) Inventors: Takashi Tobita, Hitachinaka (JP); Kentaro Tobita, Hitachinaka (JP)

(73) Assignee: Takashi Tobita, Hitachinaka-Shi, Ibaraki (JP)

( * ) Notice: Subject to any disclaimer, the term of this patent is extended or adjusted under 35 U.S.C. 154(b) by 25 days.

(21) Appl. No.: 12/857,669

(22) Filed: Aug. 17, 2010

(65) Prior Publication Data

US 2011/0056439 A1 Mar. 10, 2011

(30) Foreign Application Priority Data

Sep. 7, 2009 (JP) ................. 2009-205506

(51) Int. Cl.
*A01K 7/04* (2006.01)
*A01K 7/06* (2006.01)
(52) U.S. Cl. ........................................................ 119/78
(58) Field of Classification Search .................. 119/78, 119/72, 74, 75, 79
See application file for complete search history.

(56) References Cited

U.S. PATENT DOCUMENTS

| | | | | |
|---|---|---|---|---|
| 3,868,926 A * | 3/1975 | Olde | ................................ | 119/75 |
| 4,047,503 A * | 9/1977 | Wilmot | ............................ | 119/75 |
| 4,438,869 A * | 3/1984 | Vierkotter et al. | ................. | 222/1 |
| 4,527,513 A * | 7/1985 | Hart et al. | ...................... | 119/51.5 |
| 4,779,571 A * | 10/1988 | Row | .................................. | 119/75 |
| 5,143,257 A * | 9/1992 | Austin et al. | ..................... | 222/57 |
| 5,456,210 A * | 10/1995 | Miller | ............................. | 119/75 |
| 5,514,026 A * | 5/1996 | Schaffer | .......................... | 451/90 |
| 6,119,902 A * | 9/2000 | Shimada et al. | ............ | 222/321.3 |
| 6,620,383 B1 * | 9/2003 | Karg et al. | ..................... | 422/521 |
| 6,702,156 B2 * | 3/2004 | Shimada et al. | ............ | 222/321.7 |
| 6,706,538 B1 * | 3/2004 | Karg et al. | ..................... | 436/180 |
| 6,981,469 B1 * | 1/2006 | Welbourne | ........................ | 119/75 |
| 7,779,787 B2 * | 8/2010 | Welbourne | ........................ | 119/78 |

FOREIGN PATENT DOCUMENTS

JP 2000287572 A 10/2000

* cited by examiner

*Primary Examiner* — Yvonne Abbott

(74) *Attorney, Agent, or Firm* — Bacon & Thomas, PLLC

(57) ABSTRACT

Provided are an automatic water supply nozzle for animals capable of preventing a contamination of water in a water supply container; and an automatic water supply cap for animals enabling use of a variety of empty plastic bottles or glass bottles as a water supply container. The automatic water supply nozzle for animals has a nozzle cylinder equipped with an automatic water supply mechanism and a dropping cylinder equipped with at least one partition having a dropping tube, the dropping cylinder being coupled with the nozzle cylinder; and the automatic water supply cap for animals having the automatic water supply nozzle for animals and an attachable/detachable cap to/from a water supply container.

8 Claims, 2 Drawing Sheets

AUTOMATIC WATER SUPPLY NOZZLE FOR ANIMALS AND AUTOMATIC WATER SUPPLY CAP FOR ANIMALS

BACKGROUND

A. Field

The present invention relates to an automatic water supply nozzle for animals and an automatic water supply cap for animals, each to be used mainly for breeding experimental animals or pet animals such as rats, mice, guinea pigs, hamsters, and rabbits.

B. Background

A conventional automatic water supply nozzle for animals is equipped with a cylindrical body having a water supply port and a water inlet port and, in the cylindrical body, a valve for controlling a water supply rate and a stem for opening and closing the valve. In this automatic water supply nozzle, water is supplied to the water supply port from a water supply container when animals pull, push, or horizontally swing a portion of the stem protruded from the water supply port with their mouth to open the valve for controlling water supply rate (for example, Japanese Patent Laid-Open No. 2000-287572).

In this nozzle, water is continuously supplied from the water supply container to the water supply port of the nozzle during water supply. Upon water supply to animals after meal, food powders around their mouth attach to the water supply port or stem and further, they are dissolved in or mixed with the water in the nozzle. According to the principle that a liquid flows from a high concentration region thereof to a low concentration region thereof, water having the food powders dissolved therein or mixed therewith flows up in the nozzle and enters the water supply container, and therefore the water in the water supply container is contaminated.

In addition, a variety of empty plastic bottles or glass bottles which are ordinarily used cannot be currently used as a water supply container for animals, because the conventional water supply nozzle is integrally attached to a water supply container exclusively used therefor.

SUMMARY OF THE INVENTION

The present invention has been made in view of conventional problems and actual conditions as described above. The present invention is to provide an automatic water supply nozzle for animals and a water supply cap for animals capable of preventing a contamination of water in a water supply container and utilizing not only a container exclusively used therefore but also, as a water supply container, a variety of empty plastic bottles or glass bottles which are ordinarily used.

With a view to achieving the above-described object, the present inventor has proceeded with an extensive investigation. As a result, it has been found that when water is supplied dropwise, a continuity of water is broken, making it possible to prevent water having food powders or the like dissolved therein or mixed therewith from entering a water supply container; and when a cap equipped with a water supply nozzle is used, a variety of empty plastic bottles or glass bottles can be used as a water supply container.

The present invention therefore is provided by an automatic water supply nozzle for animals characterized in that a dropping cylinder equipped with at least one partition having a dropping tube is connected to a nozzle cylinder equipped with an automatic water supply mechanism.

In addition, the present invention is provided by an automatic water supply cap for animals characterized in that the automatic water supply nozzle for animals is equipped with an attachable/detachable cap to/from a water supply container.

When the automatic water supply nozzle for animals according to the present invention is used, water is supplied dropwise to a nozzle cylinder at the time of water supply, and thus the continuity of water is broken. This makes it possible to prevent water having food powders or the like dissolved therein or mixed therewith from flowing up and entering the water supply container. As a result, the contamination of water in the water supply container can be prevented, and therefore the sanitary water can be supplied.

In addition, when the automatic water supply cap according to the present invention is used, a variety of empty plastic bottles or glass bottles can be utilized as a water supply container.

DETAILED DESCRIPTION OF PREFERRED EMBODIMENTS OF THE INVENTION

Figure 1:
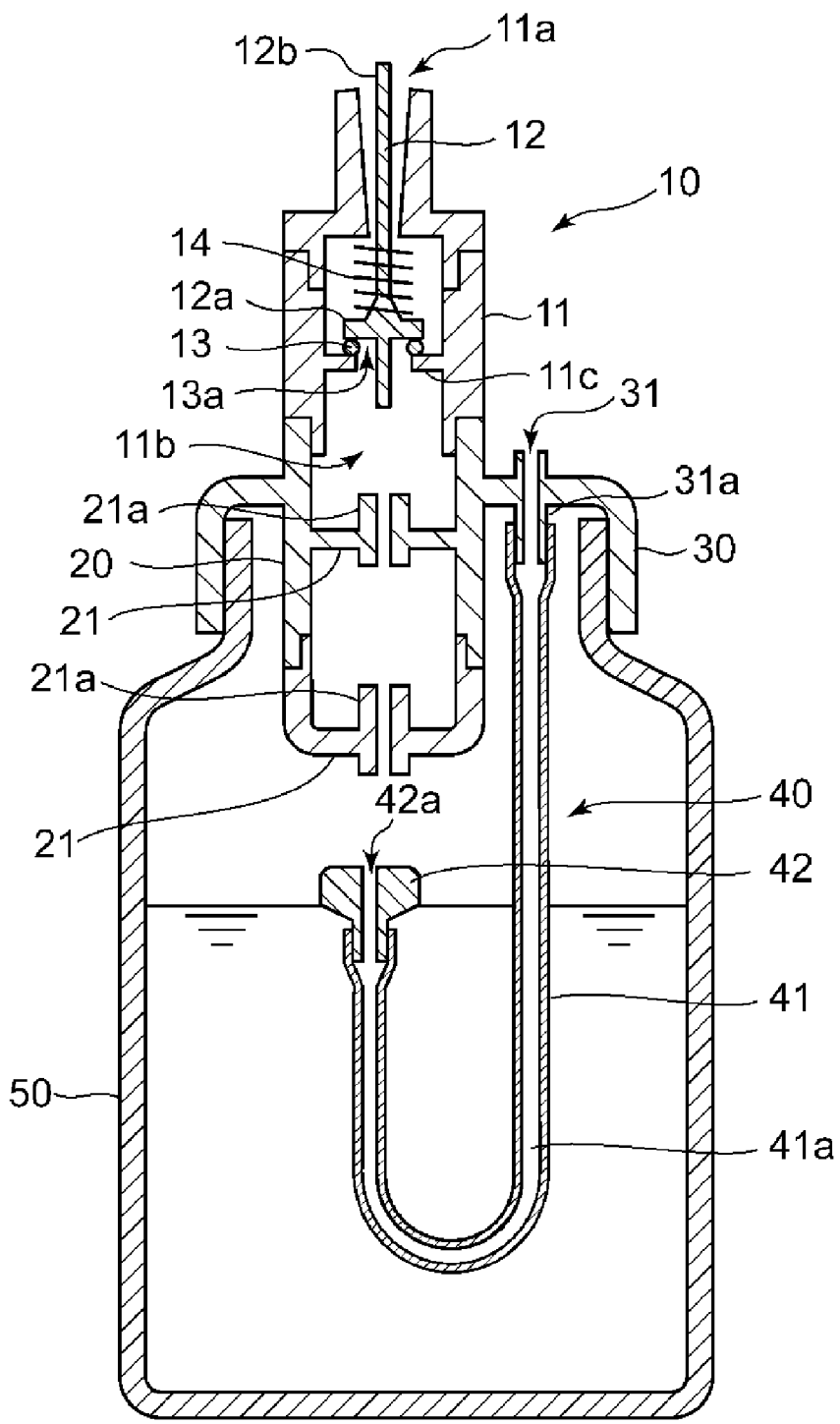
FIG. 1 is a schematic cross-sectional end view illustrating the automatic water supply cap for animals according to the present invention fixed to a water supply container.

The present invention will hereinafter be described referring to the drawings.

Figure 2:
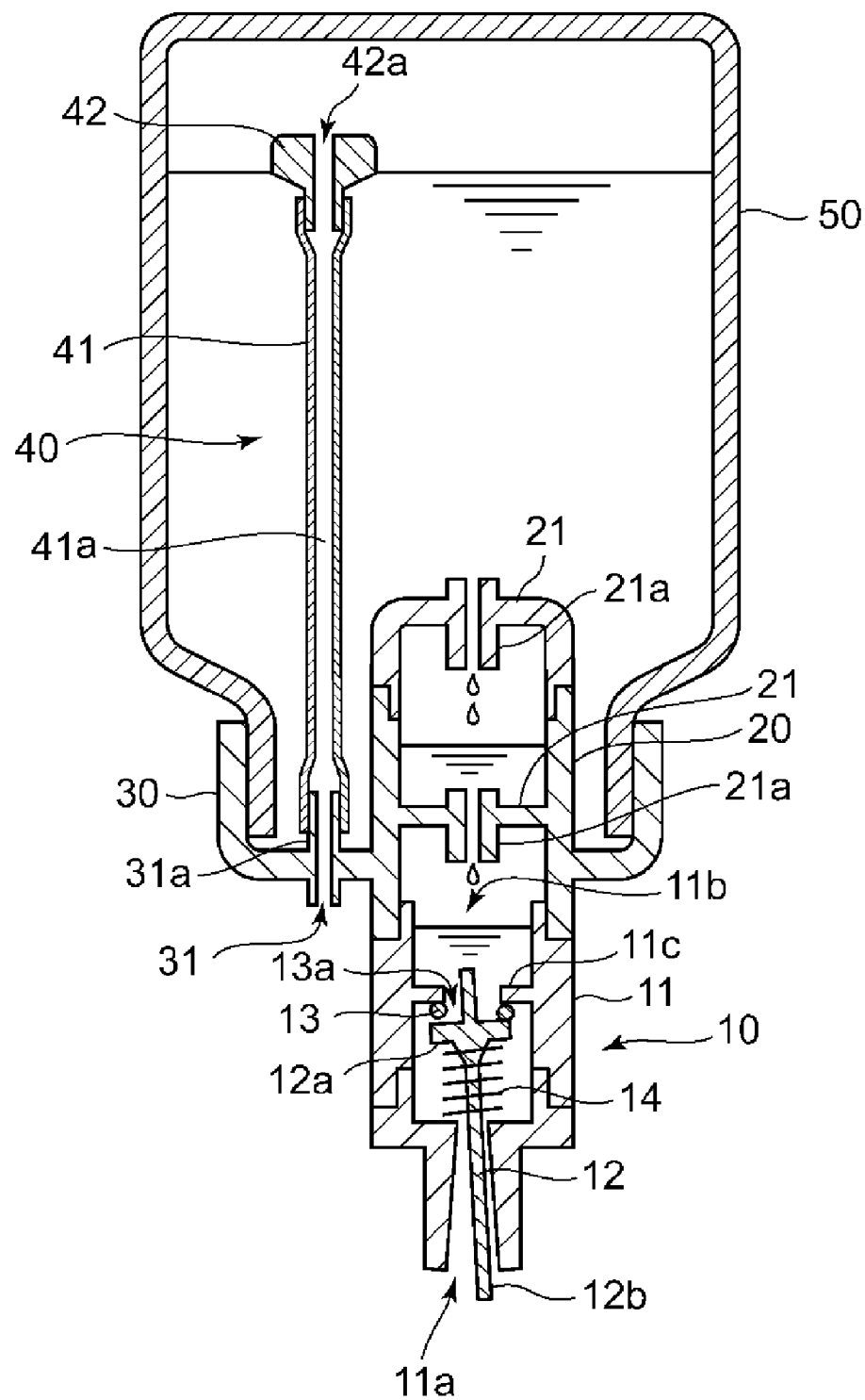
FIG. 2 is a schematic cross-sectional end view illustrating the water supply container of FIG. 1 in an inverted state.

In FIGS. 1 and 2, a nozzle cylinder 10 is equipped therein with an automatic water supply mechanism. Although no limitation is imposed on the specific structure of the automatic water supply mechanism insofar as it can automatically supply water to animals. Examples include an automatic water supply mechanism containing a cylindrical body 11 having a small-diameter water supply port 11a and a large-diameter water inlet port 11b, a stem 12 inserted in such a way that a portion thereof is protruded outside the water support port 11a, and a valve 13 whose opening or closing of water flow in the cylindrical body 11 is controlled through the movement of the stem 12.

The stem 12 opens or closes the valve 13 by means of a protruding portion 12b which is protruded outside the water supply port 11a and which is moved by the mouth of animals. The movement of the stem 12 may be either a back-and-forth motion or horizontal swing. It is desired to control the movement with a spring or the like as needed.

In the example illustrated in FIGS. 1 and 2, a water introduction hole 13a of the valve 13 attached to a projecting portion 11c at the inner wall of the cylindrical body 11 is occluded with a large diameter portion 12a of the stem 12 while being penetrated with the stem 12. At the same time, a spring 14 for controlling the horizontal swing of the stem 12 is wounded undetachably around the stem 12.

A dropping cylinder 20 has, at both ends thereof, openings, is equipped with a partition 21 having a dropping tube 21a, and is connected to the nozzle cylinder 10 on the side of the water inlet port 11b.

The number of the partition 21 may be one, but it is desired to provide a plurality of partitions 21 with a space therebetween as needed in order to stably supply dropwise water and reliably prevent the backflow of water.

In the example illustrated in FIGS. 1 and 2, two partitions 21 are provided: one is provided at a substantially center region of the dropping cylinder 20 and the other one is provided, like a top wall, at a position that will be the upper part of the dropping cylinder 20 upon water supply.

The dropping tube 21a has an inner diameter enough for supplying dropwise water but not continuously supply water. Also, the dropping tube 21a has a length enough for preventing it from contacting with water retained in the nozzle cylinder 10 or the partition 21 that lies below the tube during water supply. More specifically, the dropping tube 21a may be adjusted to an inner diameter of about from 0.1 to 3.0 mm and a length of about from 3 to 50 mm, depending on the size of the nozzle cylinder 10 or the position of the partition 21.

An attachable/detachable cap 30 to/from the water supply container is coupled to the peripheral of the dropping cylinder 20. The specific fixing means of the attachable/detachable cap 30 to/from the water supply container is not limited to screwing, elastic fitting, or the like insofar as it can be detachably mounted to the opening of a water supply container 50. Further, no limitation is imposed on the material of the attachable/detachable cap 30 to/from the water supply container. For example, synthetic resins, metals, and the like can be used. It is however advantageous to use rubber as the material of the cap because even if there are some variations in the diameter of the mouth portion of the water supply container 50, the elasticity of the rubber enables capping it with the cap.

The attachable/detachable cap 30 to/from the water supply container is equipped with an air-flow hole 31 to the water supply container 50. The air-flow hole 31 may be simply a through-hole. But, it is desired, as illustrated in FIGS. 1 and 2, to provide a protruding cylinder 31a at least on the side of the water supply container 50 and detachably connect, to the protruding cylinder 31a, an air introducing device 40 for drainage which opens at a position above the water surface in the water supply container 50 during water supply, in order to introduce the external air into the water supply container 50 and realize more smooth drainage.

The air introducing device 40 for drainage may be simply in a straw form. But, it is advantageous to be a device in which a rotameter 42 having a through-hole 42a is connected to one end of a flexible tube 41 that opens at both ends in such a way that the through-hole 42a and a hollow portion 41a of the flexible tube 41 are communicated to each other. This constituent results in that the through-hole 42a of the rotameter 42 opens above the water surface so that water does not leak from the air flow hole 31 during water supply, even if the water supply container 50 stands in any form including the upright form or the inverted form. At the same time, an air pressure is controlled by the external air reliably introduced into the water supply container 50 during water supply.

Although no particular limitation is imposed on the material of the flexible tube 41 insofar as it permits movement of the rotameter 42 on the water surface. Examples include synthetic resins, natural rubbers, and synthetic rubbers which are excellent in flexibility. In addition, the material of the rotameter 42 is also not particularly limited insofar as it floats on the water surface. The shape of it is also not limited and may be spherical, semi-spherical, conical, or cubic insofar as it has the through-hole 42a through which air flows.

According to the above-described embodiment, an automatic water supply apparatus for animals can be formed by charging with water the water supply container 50 such as an empty plastic bottle not subjected to any particular processing and then fixing the automatic water supply cap according to the present invention to the mouth portion of the container (refer to FIG. 1). Under such a state, the through-hole 42a of the rotameter 42 opens at a position above the water surface so that no water enters the flexible tube 41.

When the automatic water supply apparatus for animals is used, it is turned upside down (refer to FIG. 2). The rotameter 42 spontaneously moves above the water surface. The external air is therefore introduced into the water supply container 50 by passing it through the air-flow hole 31, the hollow portion 41a of the flexible tube 41, and through-hole 42a of the rotameter 42. Under this state, water is not discharged because the water introduction hole 13a of the valve 13 is occluded with the large diameter portion 12a of the stem 12 by the stretching force of the spring 14.

In the meantime, when an animal bites and pulls or swings the protruding portion 12b of the stem 12, which protrudes outside the water supply port 11a, the spring 14 constricts and the water introduction hole 13a of the valve 13 is opened. As a result, water in the water supply container 50 is discharged from the water supply port 11a of the nozzle cylinder 10.

When the animal releases the stem 12 from its mouth, the water introduction hole 13a of the valve 13 is then occluded again with the large diameter portion 12a of the stem 12 due to a restoring force of the spring 14 so that discharge of water is stopped.

DESCRIPTION OF DRAWING ELEMENTS

10: nozzle cylinder
11: cylindrical body
11a: water supply port
11b: water inlet port
11c: projecting portion
12: stem
12: large diameter portion
12b: protruding portion
13: valve
13a: water introduction hole
14: spring
20: dropping cylinder
21: partition
21a: dropping tube
30: attachable/detachable cap to/from water supply container
31: air-flow hole
31a: protruding cylinder
40: air introducing device for drainage
41: flexible tube
41a: hollow portion
42: rotameter
42a: through-hole
50: water supply container

What is claimed:

1. An automatic water supply nozzle for animals, comprising a nozzle cylinder equipped with an automatic water supply mechanism and a dropping cylinder equipped with at least one partition having a dropping tube, the dropping cylinder being connected to the nozzle cylinder.

2. The automatic water supply nozzle for animals according to claim 1, wherein the automatic water supply mechanism comprises a cylindrical body having a water supply port and a water inlet port; a stem inserted into the water supply port while protruding a portion of the stem outside the water supply port; and a valve whose opening or closing for water flow in the cylindrical body is controlled through the movement of the stem.

3. The automatic water supply nozzle for animals according to claim 2, wherein the stem comprises a spring for controlling a back-and-forth motion or horizontal swing of the stem.

4. The automatic water supply nozzle for animals according to claim 1, wherein the dropping tube has an inner diameter of from 0.1 to 3.0 mm and a length of from 3 to 50 mm.

5. An automatic water supply cap for animals, comprising the automatic water supply nozzle according to claim 1 and an attachable/detachable cap to/from a water supply container.

6. The automatic water supply cap for animals according to claim 5, wherein the cap comprises an air-flow hole.

7. The automatic water supply cap according to claim 6, wherein the air-flow hole comprises an air introducing device for drainage which device opens above the surface of water in the water supply container during water supply.

8. The automatic water supply cap according to claim 7, wherein the air introducing device for drainage is formed by connecting a rotameter having a through-hole to one end of a flexible tube opened at both ends thereof in such a way that the through-hole is communicated with a hollow portion of the flexible tube.

* * * * *